US011250526B2

(12) United States Patent
Stencil, Jr. et al.

(10) Patent No.: US 11,250,526 B2
(45) Date of Patent: Feb. 15, 2022

(54) DYNAMIC CONTENT GENERATOR

(71) Applicant: LEAP, LLC, Hanover, MD (US)

(72) Inventors: Steven Charles Stencil, Jr., Severn, MD (US); Thomas James Bury, III, Ellicott City, MD (US); Patrick Michael Fingles, Sykesville, MD (US)

(73) Assignee: LEAP, LLC, Hanover, MD (US)

( * ) Notice: Subject to any disclaimer, the term of this patent is extended or adjusted under 35 U.S.C. 154(b) by 522 days.

(21) Appl. No.: 15/785,258

(22) Filed: Oct. 16, 2017

(65) Prior Publication Data

US 2019/0026847 A1  Jan. 24, 2019

Related U.S. Application Data

(60) Provisional application No. 62/535,436, filed on Jul. 21, 2017.

(51) Int. Cl.
*G06Q 50/18* (2012.01)
*G06Q 10/10* (2012.01)
(Continued)

(52) U.S. Cl.
CPC ............ *G06Q 50/18* (2013.01); *G06Q 10/10* (2013.01); *G06Q 30/0621* (2013.01); *G06Q 30/0643* (2013.01); *G06Q 50/08* (2013.01)

(58) Field of Classification Search
CPC ........ G06Q 50/18; G06Q 10/10; G06Q 50/08; G06Q 30/0621; G06Q 30/0643
(Continued)

(56) References Cited

U.S. PATENT DOCUMENTS 5,237,379 A * 8/1993 Sklut .................. G03G 15/5095
399/376
5,446,653 A 8/1995 Miller et al.
(Continued)

FOREIGN PATENT DOCUMENTS

EP  1 306 772 A1  2/2003
WO  WO 0104772  1/2001

OTHER PUBLICATIONS

PC Magazine, Encyclopedia, https://www.pcmag.com/encyclopedia/term/50292/recompile (May 9, 2013).*
(Continued)

*Primary Examiner* — Andrew B Whitaker
*Assistant Examiner* — Johnathan J Lindsey, III
(74) *Attorney, Agent, or Firm* — Haynes and Boone, LLP

(57) ABSTRACT

System, method, and a computer program product that generate a dynamic digital contract are provided. A category that is included in the digital contract is selected using a graphical user interface of an application executing on a client device. A template associated with the category is retrieved from memory storage. The template is also associated with a plurality of options that specify the layout of the digital contract, display text of the digital contract and receive additional input. Data associated with the template is retrieved. The digital contract is generated by incorporating the data into the plurality of options. The digital contract is then formatted using parameters of the client device. Once generated, the digital contract is displayed on the display screen of the client device.

17 Claims, 16 Drawing Sheets

(51) Int. Cl.
*G06Q 50/08* (2012.01)
*G06Q 30/06* (2012.01)

(58) Field of Classification Search
USPC .......................................................... 705/342
See application file for complete search history.

(56) References Cited

U.S. PATENT DOCUMENTS

| | | | |
|---|---|---|---|
| 5,502,555 A * | 3/1996 | Lakatos | G03G 15/6508 |
| | | | 271/9.01 |
| 5,692,206 A | 11/1997 | Shirley et al. | |
| 6,023,714 A * | 2/2000 | Hill | G06F 17/211 |
| | | | 715/235 |
| 6,064,969 A | 5/2000 | Haskins | |
| 6,065,026 A | 5/2000 | Cornelia et al. | |
| 6,067,531 A | 5/2000 | Hoyt et al. | |
| 7,028,047 B2 | 4/2006 | Boulmakoul et al. | |
| 7,085,926 B1 * | 8/2006 | Peach | G06Q 20/00 |
| | | | 705/64 |
| 7,568,104 B2 * | 7/2009 | Berryman | G06F 21/64 |
| | | | 713/150 |
| 7,581,176 B2 * | 8/2009 | Wilson | G06F 17/243 |
| | | | 715/243 |
| 7,853,498 B2 | 12/2010 | Finley et al. | |
| 8,453,050 B2 * | 5/2013 | Dias | G06F 17/2247 |
| | | | 713/176 |
| 8,473,389 B2 | 6/2013 | Wade | |
| 8,578,265 B2 * | 11/2013 | Bajohr | G06F 17/24 |
| | | | 715/234 |
| 2002/0042757 A1 | 4/2002 | Albazz et al. | |
| 2002/0091651 A1 * | 7/2002 | Petrogiannis | G06F 21/64 |
| | | | 705/76 |
| 2005/0091143 A1 | 4/2005 | Schmidt et al. | |
| 2005/0160278 A1 * | 7/2005 | Farquharson | G06Q 10/10 |
| | | | 713/189 |
| 2006/0080181 A1 | 4/2006 | Fernandes et al. | |
| 2006/0287966 A1 | 12/2006 | Srinivasaraghavan et al. | |
| 2007/0203854 A1 * | 8/2007 | Karamchedu | G06Q 10/067 |
| | | | 705/80 |
| 2008/0243662 A1 * | 10/2008 | Subramaniam | G06Q 10/10 |
| | | | 705/35 |
| 2009/0157538 A1 * | 6/2009 | Subramaniam | G06Q 10/10 |
| | | | 705/35 |
| 2011/0296191 A1 * | 12/2011 | Mouille | G06F 21/645 |
| | | | 713/176 |
| 2013/0091422 A1 * | 4/2013 | Potnis | G06F 17/2229 |
| | | | 715/255 |
| 2014/0041052 A1 * | 2/2014 | Follis | H04L 9/3247 |
| | | | 726/28 |
| 2014/0052575 A1 | 2/2014 | Yu et al. | |
| 2014/0058964 A1 * | 2/2014 | Bailey | G06Q 10/06 |
| | | | 705/317 |
| 2014/0104279 A1 * | 4/2014 | Albrecht | G01C 21/367 |
| | | | 345/440 |
| 2014/0115713 A1 * | 4/2014 | Picazo | G06F 21/64 |
| | | | 726/26 |
| 2014/0214473 A1 * | 7/2014 | Gentile | G06Q 10/06313 |
| | | | 705/7.23 |
| 2014/0222695 A1 * | 8/2014 | Yang | H04W 4/18 |
| | | | 705/311 |
| 2015/0213397 A1 * | 7/2015 | Arena | G06Q 10/063118 |
| | | | 705/7.17 |
| 2016/0139691 A1 * | 5/2016 | Li | G06F 3/03545 |
| | | | 345/179 |
| 2016/0140098 A1 * | 5/2016 | Leese | G06F 3/005 |
| | | | 715/268 |
| 2016/0269184 A1 * | 9/2016 | VanBlon | H04L 9/3247 |
| 2016/0292804 A1 * | 10/2016 | Takahashi | G06Q 50/18 |
| 2017/0270320 A1 * | 9/2017 | Petrogiannis | G06F 21/64 |
| 2018/0005186 A1 * | 1/2018 | Hunn | G06F 16/219 |

OTHER PUBLICATIONS

Whitson Gordon, What's the Best Way to Sign Documents Electronically (Without Scanning Them)?, Life Hacker. https://lifehacker.com/5990172/whats-the-best-way-to-to-sign-documents-electronically-without-scanning-them (Mar. 13, 2013).*

Quickbooks, 7 Digital Signing Apps for Contracts and Other Agreements, https://quickbooks.intuit.com/r/tech-review/7-digital-signing-apps-for-contracts-and-other-agreements/ (Dec. 7, 2016).*

"Divide," Merriam-Webster.com (Apr. 25, 2009). (Year: 2009).*

15785258 EIC 3600 Search Report dated Nov. 30, 2021 (Year: 2021).*

Daskalopulu Aspassia et al., "A Constraint-Driven System for Contract Assembly", Proceedings of the 5$^{th}$ International Conference on Artificial Intelligence and Law; College Park, MD, USA, May 21-24, 1995, 1995, pp. 62-70, XP002231240 Proc Int Conf Artif Intell Law; Proceedings of the International Conference on Artificial Intelligence and Law 1995 ACM, New York, NY, USA.

* cited by examiner

Page 3 of 10 leap www.leaptodigital.com

Customer Information

| Jerry Johnson | (465)465-1654 | Date: 03-29-2017 |
| | jerry@yahoo.com | Rep: Steve Demo |

The following windows will be installed by Leap To Digital

| Total number of windows in the house | 3 |
| Total number of windows being installed | 2 |

Window Details

| | Window Style | Garden | Window Brand | Ultramaxx |
|  | Location | Master Bedroom | Quantity | 2 |
| | Size | 30 1/2 X 30 5/8 | Inside Color | White |
| | Outside Color | White | Coil Color | Glacier White |
| | Grid Style | Colonial | Screen Type | Half |
| | Tempered Glass | Not included | | |

| | Window Style | Garden | Window Brand | Ultramaxx |
| 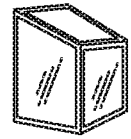 | Location | Master Bedroom | Quantity | 2 |
| | Size | 30 1/2 X 30 5/8 | Inside Color | White |
| | Outside Color | White | Coil Color | Glacier White |
| | Grid Style | Colonial | Screen Type | Half |
| | Tempered Glass | Not included | | |

| | Window Style | Garden | Window Brand | Ultramaxx |
| 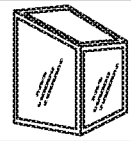 | Location | Master Bedroom | Quantity | 2 |
| | Size | 30 1/2 X 30 5/8 | Inside Color | White |
| | Outside Color | White | Coil Color | Glacier White |
| | Grid Style | Colonial | Screen Type | Half |
| | Tempered Glass | Not included | | |

| | Window Style | Garden | Window Brand | Ultramaxx |
| 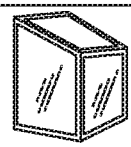 | Location | Master Bedroom | Quantity | 2 |
| | Size | 30 1/2 X 30 5/8 | Inside Color | White |
| | Outside Color | White | Coil Color | Glacier White |
| | Grid Style | Colonial | Screen Type | Half |
| | Tempered Glass | Not included | | |

| | Window Style | Garden | Window Brand | Ultramaxx |
| 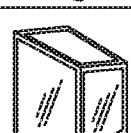 | Location | Master Bedroom | Quantity | 2 |
| | Size | 30 1/2 X 30 5/8 | Inside Color | White |
| | Outside Color | White | Coil Color | Glacier White |
| | Grid Style | Colonial | Screen Type | Half |
| | Tempered Glass | Not included | | |

| | Window Style | Garden | Window Brand | Ultramaxx |
| 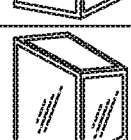 | Location | Master Bedroom | Quantity | 2 |
| | Size | 30 1/2 X 30 5/8 | Inside Color | White |
| | Outside Color | White | Coil Color | Glacier White |
| | Grid Style | Colonial | Screen Type | Half |
| | Tempered Glass | Not included | | |

• • • • • • • • • •

Items 204    Features 206

FIG. 8

Customer Information

| Jerry Johnson | (465)465-1654 | Date: 03-29-2017 |
| | jerry@yahoo.com | Rep: Steve Demo |

| Homeowner's Association | No |
|---|---|
| Total Cotract Amount | $12,345.00 |

Cash Payment

| Amount Paid In Cash | $250.00 |
|---|---|
| Cash Deposit | $350.00 |
| Cash Due Upon Completion | -$100.00 |
| Form of Payment | Check |
| Check # | 3333 |
| Check Date | 03/29/2018 |

Financing Details

| Amount Financed | $12,095.00 |
|---|---|
| Estimated Monthly Payment | $25.55 |

Customers have 2 payment options:

X _____

| Steve Demo | Jerry Johnson |
| Date | Date 03-29-2017 |

*This space intentionally left blank*

FIG. 9

| Back | Select Brochures | Send |

- Gutters & Trim
- G8 Trim Coil
- New Type
- Misc.
- Provia Doors
- Leap's Website
- Roofing
- Duration Shingles
- Duration Designer Shingles
- Supreme Shingles
- Siding
- Charter Oak Brochure
- Fullback Insulation
- Fanfold Insulation
- Board & Batten
- Pelican Bay
- Williamsport Beaded
- Conquest
- Windows
- Mezzo
- Sliding Doors Standard
- Sliding Doors Promenade

FIG. 10

| Back | Select Brochures | Send |
|---|---|---|

Gutters & Trim

G8 Trim Coil

New Type

Misc.

Provia Doors

Leap's Website

Roofing

Duration Shingles

Duration Designer Shingles

Supreme Shingles

Siding

Charter Oak Brochure

Fullback Insulation

Fanfold Insulation

Board & Batten

Verify Email
stevestencil@gmail.co
Cancel    Send

FIG. 11 noreply@leaptodigital.com
Leap One Project (Jerry Johnson)
To: Steve Stencil Cc:Steve Stencil leap Helping Businesses TAKE THE LEAP to the World of Digital.

Thank you!

Lorem Ipsum dolor sit amet, consectetur adipiscing elit. Donec ornare tempus massa, eu rutrum quam varius in. Duis sed odio faucibus velit viverra tempor vel quis ex. Nullam pretium faucibus est at varius. Mauris pretium sed libero non porttitor. Aliquam fringilla blandit faucibus. Ut et convallis tortor, ac molestie tortor. Vestibulum in diam hendrerit metus ultrices semper. Nulla aliquam urna vel luctus blandit.

Duis at erat a tortor maximus ornare. Maecenas non accumsan nisl Aenean condimentum porttitor orci sit amet facilisis. Aenean consectetur sapien ultricies pulvinar malesuada. Mauris nulla libero, pellentesque non enim eget, scelerisque dignissim lacus. Duis ac condimentum elit, sit amet laoreet risus.

Welcome to the LEAP Family!!!

Steve Stencil

More information...

Descriptive Information
1102

- LeaptoDigital.com
- Fullback Insulation
- Fanfold Insulation
- Board & Batten Siding
- G8 Trim Coil
- Provia Doors
- Owens Corning Duration Shingles
- Owens Corning Duration Designer Colors Shingles

1100

1002

1100

1101

(N)

DYNAMIC CONTENT GENERATOR

CROSS-REFERENCE TO RELATED APPLICATION

This application claims priority to U.S. Provisional Application No. 62/535,436, filed on Jul. 21, 2017, which is incorporated herein by reference in its entirety.

TECHNICAL FIELD

The disclosure generally relates to software applications, and specifically to using a software application to generate a dynamic digital contract.

BACKGROUND

Conventional contracts are static documents that are not easily modified in real-time. When conventional contracts are written and stored on a computing device, conventional contracts are typically converted into portable document format ("pdf") documents. To modify conventional contracts, users may print the contracts and manually add text or modify the printed copies. Alternatively, the users may use software, such as Adobe®. Adobe® can modify conventional contracts by overlaying existing text with text, date or signature fields and adding text to these fields. However, these fields do not create a new copy of a contract, nor move around existing text.

When data is added to conventional contracts, conventional contracts do not validate the added data. For example, a representative selling different doors or windows made by a particular manufacturer can accidently include door or window color that the manufacturer does not produce. Such error may result in an invalid contract, annulled contract, and/or dissatisfied contract participants.

Further, because conventional contracts are pre-written, conventional contracts are generic. This means that conventional contracts are not customized and include unnecessary terms and conditions and other text. Users can remove the unnecessary terms and conditions by striking the terms and conditions out in a conventional contract. Alternatively, Adobe® can overlay the unnecessary terms and conditions with an empty text box and mask the unnecessary text. However, such conventional contracts are messy and create empty space or extra pages that may not always be filled by text germane to the contract.

Hence, there is a need for customizable, dynamically generated, digital contracts, and these above problems with conventional contracts have been identified by the present disclosure in connection with this solution as presented herein.

SUMMARY OF THE DISCLOSURE

Embodiments describe a system and method for generating a dynamic digital contract. A category for the digital contract is selected from a graphical user interface of an application that executes on a client device. A template associated with the category is retrieved from the memory storage. The template is associated with a plurality of options that specify the layout of the digital contract, display terms and conditions of the digital contract, and receive input to the digital contract. Data to be included in the digital contract is also retrieved from the memory storage. The application generates the digital contract by incorporating the retrieved data into the template and options associated in the template. Additionally, the application generates the digital contract using parameters of the client device. Once the digital contract is generated, the application displays the digital contract on the display screen of the client device.

Embodiments describe the digital contract that may be regenerated in real-time based on input. The graphical user interface of the application receives input that causes an additional option to be added into the digital contract. The application regenerates the digital contract to include the additional option. Further the application includes the additional option at a location in the digital contract that is specified by the option. In other words, the option is not appended to the end of the digital contract and does not overlay existing data or options displayed in the digital contract. Rather, the application may regenerate the entire digital contract to include the additional option in the beginning, middle, etc., of the contract, and redisplay the digital contract on the graphical user interface of the computing device.

Embodiments describe another digital contract that is also regenerated based on input. The graphical user interface of the application receives input that causes an option displayed in the digital contract to be removed from the digital contract. The application regenerates the digital contract without the option and replaces the space vacated by the option with other options that remain in the digital contract.

Embodiments describe the digital contract that includes an option that generates a sketch. Once the graphical user interface of the application receives the sketch as input, the application regenerates the digital contract to include the sketch.

Embodiments describe the digital contract that may be digitally signed. The application scans the digital contract for an option that receives a signature as input. Once the option is identified, the application initiates a signature capture window that receives the signature input. The application then regenerates the digital contract to include the signature.

Embodiments describe the digital contract that includes descriptive material. The graphical user interface of an application displays a plurality of descriptive materials. Once a descriptive material from the plurality of descriptive materials is selected, the application regenerates the digital contract to include the selected descriptive material.

Embodiments describe the digital contract that includes a preselected item. A preselected item is an item that is selected in the application prior to the application generating the digital contract. After the item is selected, the application generates the digital contract to include the item and at least one feature associated with the item.

BRIEF DESCRIPTION OF THE DRAWINGS

FIG. 4 is a screen shot of application displaying items and features, according to an embodiment.

FIG. 8 is a screen shot of a digital payment form, according to an embodiment.

FIG. 9 is a screen shot of a digital form displaying descriptive information, according to an embodiment.

FIG. 10 is a screen shot of the application receiving an email address, according to an embodiment.

FIG. 11 is a screen shot of a formatted email, according to an embodiment.

Figure 1A:
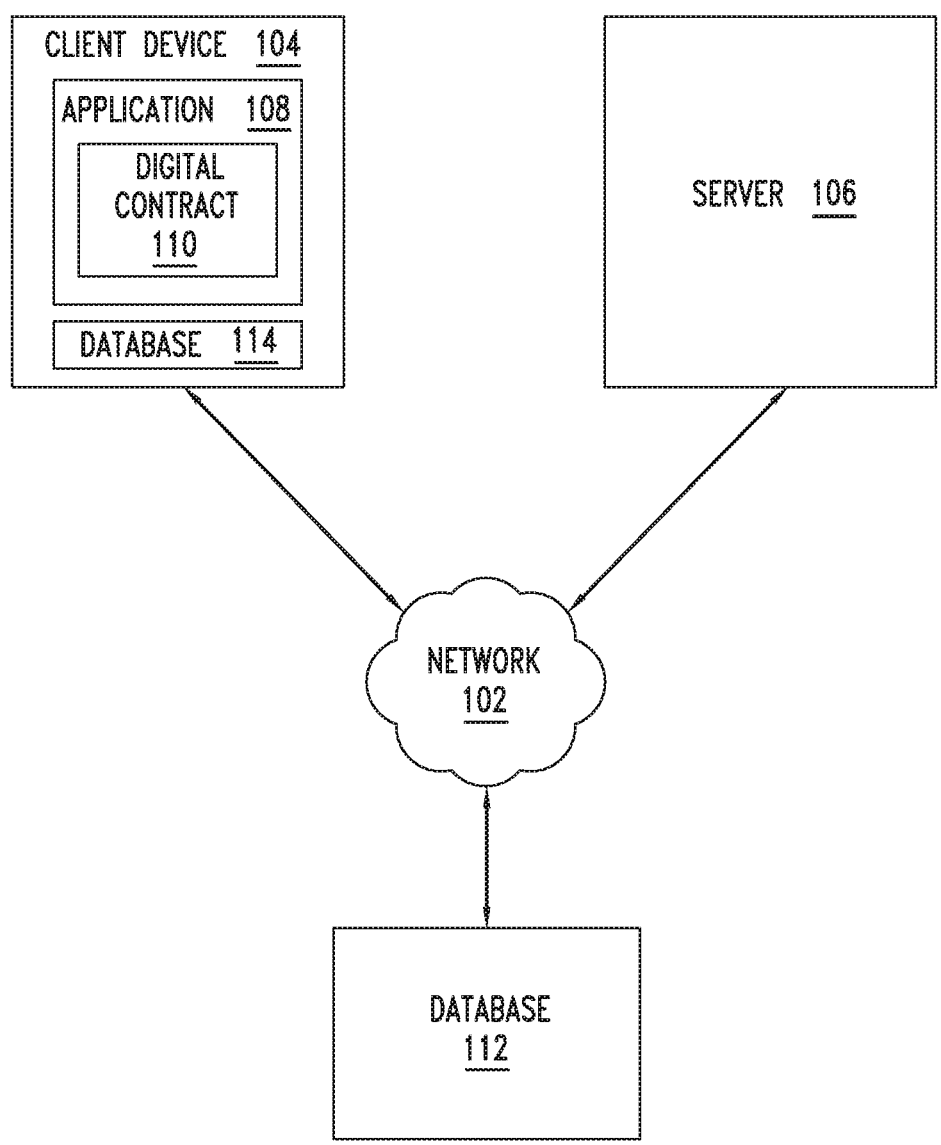
FIGS. 1A and 1B are block diagrams of system environments where embodiments can be implemented.

Embodiments of the disclosure and their advantages as depicted by the figures described above are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The disclosure provides systems, methods, and computer program products that generate a dynamic digital contract. The dynamic digital contract may be generated based on one or more selected categories. For instance, an application has access to one or more templates that correspond to one or more categories. Each template is a software structure that includes instructions for laying out a portion of the digital contract associated with a corresponding category. Each template also includes multiple options that are configured to display data or receive input. The application generates the digital contract by incorporating data into options associated with one or more templates. The application also formats the digital contract for display on the electronic display of the client device based on the parameters associated with the client device.

The disclosure also provides an application that regenerates the digital contract based on input. For example, some input may cause the application to include additional options into the digital contract. In this case, the application regenerates the digital contract and incorporates the additional options into the portion of the digital contract specified by the option. Similarly, some input may cause the application to remove an existing option from the digital contract. In this case, the application regenerates the digital contract without the option.

The embodiments described herein provide numerous improvements over traditional paper contracts. First, the embodiments provide for real-time regeneration of the digital contract. This allows the application executing on a computing devices to regenerate the design, layout, and content of the digital contract in real-time and based on newly added input. In this way, the regenerated digital contract includes new content without the old, irrelevant content and/or irrelevant clauses being crossed out or overlaid with the new content and/or clauses. Also, in this way, the application, in real-time, removes from the layout of the digital contract blank spaces or irrelevant content and adds to the digital contract additional options that may provide further input. Because the digital contract is regenerated in real-time, the additional options may be incorporated into any location within the digital contract and/or at the location specified by the additional options. Second, the embodiments also provide for real-time verification of the digital contract. This prevents the contract from including content and/or clauses, etc., that may not be fulfilled and/or executed. In one embodiment, the input may be verified against preconfigured lists, items, database, etc., prior to the input or the options based on the input being incorporated into the digital contract. In another embodiment, the input may cause an application to regenerate the digital contract with an option that may include preconfigured and/or selectable verified content, and thus avoid unexpected and not verified input.

Further embodiments of the disclosure are provided below.

FIG. 1A is an exemplary system 100A where embodiments can be implemented. System 100 includes a network 102. Network 102 may be implemented as a single network or a combination of multiple networks, including local area networks (LANs), wide area networks (WANs) such as the Internet or the Word Wide Web, metropolitan area networks (MANs), etc. Network 102 may also include one or more of intranets, landline networks, wireless networks, and/or other appropriate types of networks.

Example system 100A includes a client device 104. Client device 104 may be a portable or non-portable electronic device under control of a user, and configured to transmit, receive, and manipulate data over network 102. Example client device 104 may include a smartphone, a tablet, a laptop computer, a wearable electronic device, eyeglasses that can be incorporated into an electronic device, an electronic watch, etc. Client device 104 may also include and execute operating systems, such as iOS, Android, Unix, Linux, Microsoft Windows, etc. Although system 100A includes a single client device 104, there may be multiple client devices 104 connected to network 102. In a further embodiment, one or more components that may be included in the client device 104 are described in detail in FIG. 15.

In an embodiment, system 100A includes a server 106. Server 106 may be an application server, a web server, a cloud server, etc., that provides data and information to client device 104. In an embodiment, server 106 stores data, resources, instructions, etc. Server 106 may also provide resources for installation on client device 104.

Example client device 104 stores and executes an application 108. Application 108 may be a software application designed using software development kit ("SDK"), Java, C++, JavaScript, Python, CSS, PHP, Rube, etc., or any combination thereof. Application 108 may be pre-installed on the client device 104, installed on the client device 104 using portable memory storage devices, such as compact disks or a thumb-drives, etc. Application 108 may also be downloaded from server 106. Once installed, client device 104 may receive an indication from a user to activate application 108 and cause application 108 to execute on client device 104.

Figure 1B:
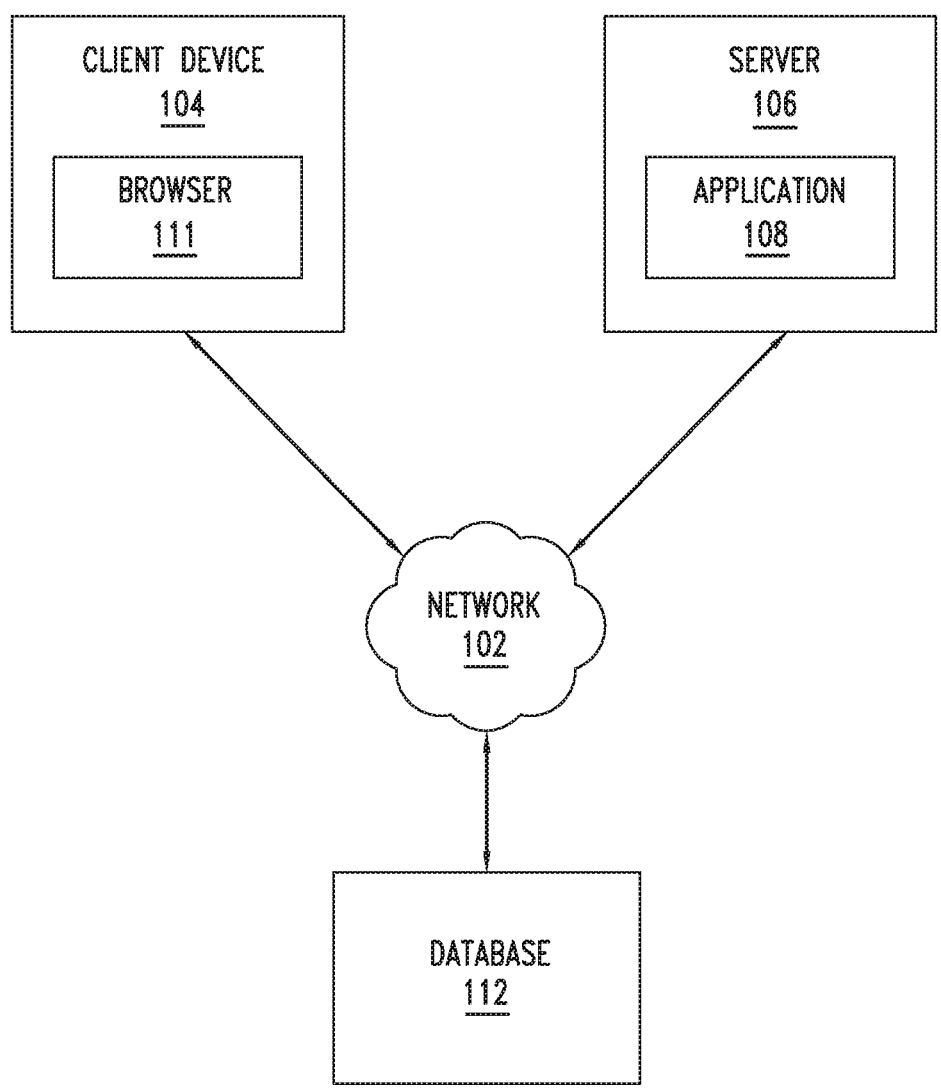

In another embodiment, shown in FIG. 1B, system 100B, client device 104 may include a browser 111. Browser 111 is an application executing on client device 104 that retrieves and presents information resources that are stored on server 106 connected to the Internet or the World Wide Web. An information resource may be identified by a uniform resource identifier (URI) or a uniform resource locator (URL) and may be a webpage, an image, a video, or another type of content.

Unlike in FIG. 1A, application 108 in FIG. 1B executes on server 106 and provides content for display on client device 104. In an embodiment, browser 111 may retrieve a URL associated with the webpage of application 108 and display the webpage and content in the webpage on the electronic display of client device 104. A person of ordinary skill in the art will appreciate that an implementation is not limited to this embodiments, and applications other than browser 111 may also display application 108 generated content on client device 104.

In an embodiment, application 108 may generate dynamic digital contracts 110. Application 108 may dynamically generate digital contracts 110 in real-time based on the user provided input, preconfigured information stored in systems 100A or 100B, information specific to client device 104, etc. In an embodiment, application 108 may also regenerate the digital contract 110 in real-time based on the information provided to application 108 after the digital contract 110 has been generated. When application 108 regenerates the digital contract, application 108 may regenerate all or a portion of the digital contract from scratch.

System 100A includes a database 112. Database 112 is a collection of tables, views, schemas, etc. Database 112 may be configured to store organized data in memory storage, such as one of memories described in detail in FIG. 15. Example data may include product categories, items within each product category, description of the items, terms and conditions associated with each category and/or item, credentials of users using application 108, customer credentials, customer lists, etc.

In an embodiment, application 108 may retrieve data from database 112 directly or by way of server 106. Once retrieved, application 108 may display the data on client device 104. Because application 108 retrieves data from database 112, one way to update data on multiple applications 108 is to update data in database 112 and then issue a command to applications 108 executing on client devices 104 to retrieve the updated data from database 112.

In an embodiment, client device 104 also includes a database 114. Database 114 is also a collection of tables, views, schemas, etc., and is configured to store organized data in memory storage. In an embodiment, database 114 may store a subset of data stored in database 112. Additionally, database 114 may periodically, or on request, synchronize with database 112 and upload changes to data stored in database 112 to database 114 and vice versa. Because database 114 is stored on client device 104, application 108 may access database 114 without requiring access to network 102. In this way, application 108 may read, write and modify data stored in database 114 when client device 104 does not have access to network 102 and may synchronize data with database 112 once connection to network 102 is reestablished.

Figure 2:
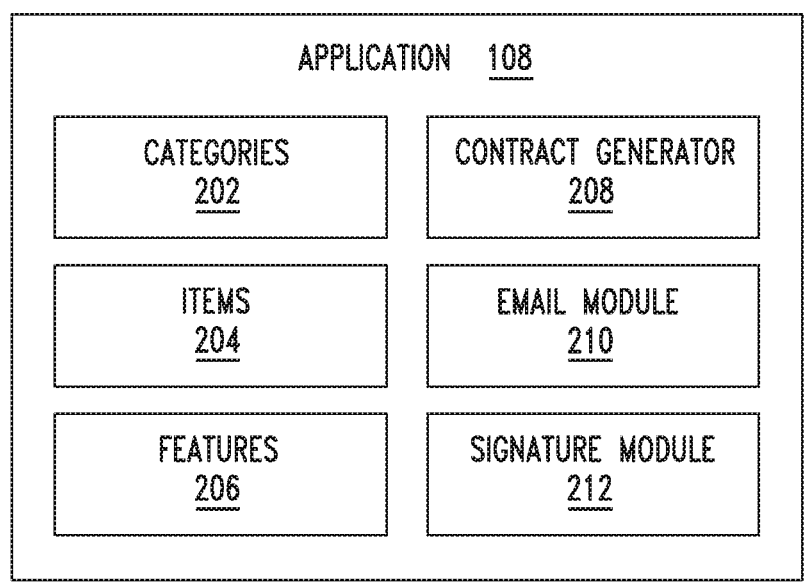
FIG. 2 is a block diagram of an application, according to an embodiment.

FIG. 2 is a block diagram 200 of application 108, according to an embodiment. As discussed above, application 108 generates dynamic digital contracts 110. To generate digital contracts 110, application 108 includes or accesses categories 202, items 204, and features 206. Categories 202, items 204, and features 206 may be stored in database 112, database 114, or another memory storage, and may be accessed by application 108 upon request. In an embodiment, one party to the contract may upload the categories 202, items 204, and features 206 to database 112. In this way, the uploaded categories 202, items 204, and features 206 may be validated in the database 112 and prior to being included in the digital contract 110.

In an embodiment, categories 202 may be high level, general terms for products, articles of manufacture, tangible or intangible assets, etc., that are to be included in digital contract 110. In an embodiment, categories 202 may be displayed on a display screen of client device 104 via a graphical user interface ("GUI") or browser 111. Once displayed, application 108 may receive input from a user of client device 104. The input may select one or more categories from categories 202. As described below, application 108 may use the selected categories from categories 202 to generate the digital contract 110.

Figure 3:
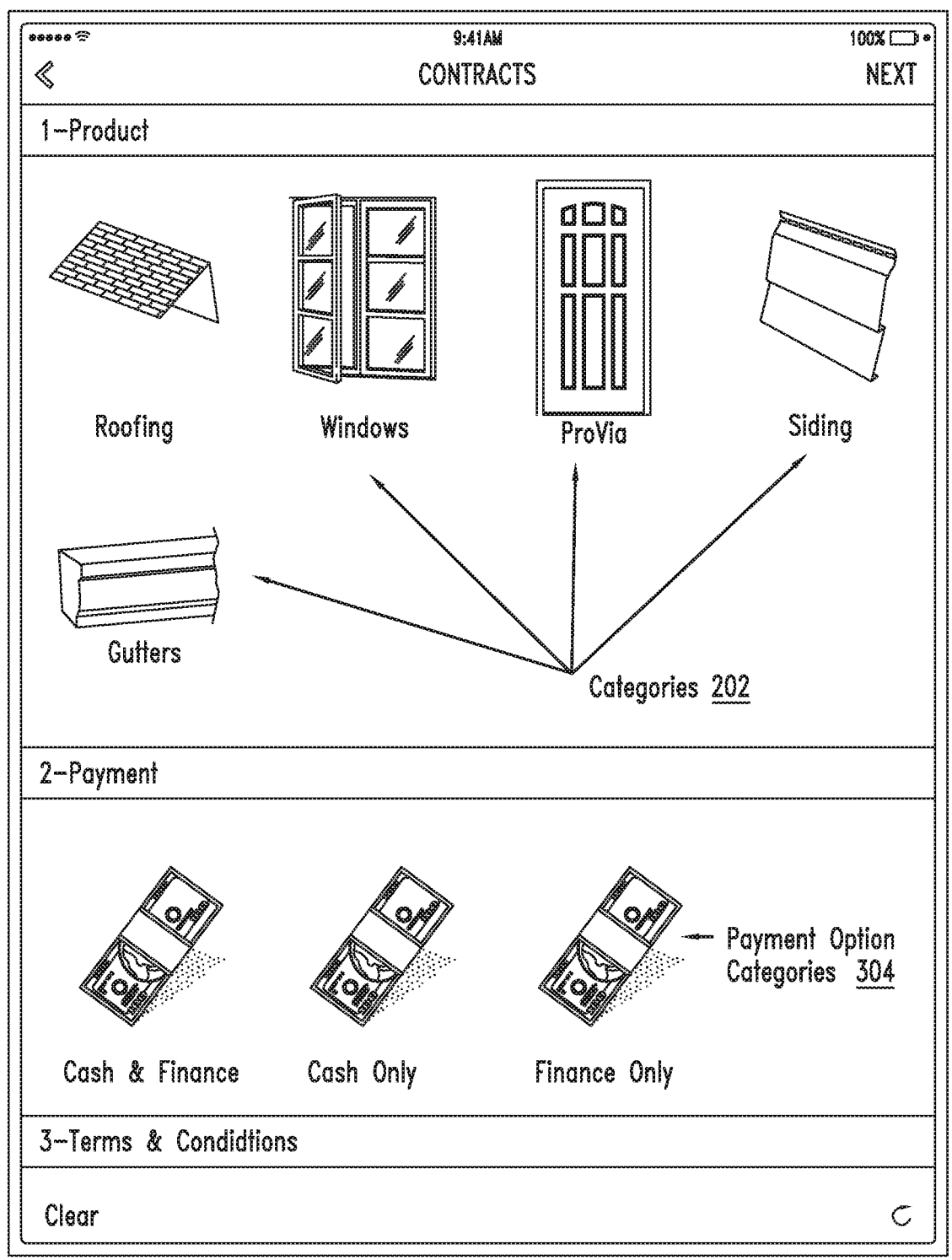
FIG. 3 is a screen shot of an application displaying categories that may be included in a digital contract, according to an embodiment.

FIG. 3 is a screen shot 300 of application 108 displaying categories 202 that may be included in the digital contract 110, according to an embodiment. Example categories 202 include general terms for products, such as: roof, windows, doors, siding, and gutters. As illustrated in FIG. 3, categories 202 are displayed pictorially, though the implementation is not limited to this embodiment, and categories 202 may also be displayed in a list, thumbnails, etc. Other categories could include anything typically used in a home (e.g., a condo, apartment, townhouse, free-standing home, boat), office, or commercial building or store, although the disclosure herein is generally directed to describing new homes and home improvement options as exemplary categories. For example, the categories can include types of room, improvements to existing features (e.g., new cabinets or appliances such as in a kitchen, new faucets or shower heads in a kitchen or bathroom, new light fixtures such as in a foyer or dining room, etc.)

In an embodiment, the GUI of application 108 may receive a selection of one or more categories from categories 202. Application 108 may then generate digital contract 110 based on the selected categories. For example, if the GUI receives a selection for roof and windows categories, application 108 may generate digital contract 110 that includes terms and condition for the roof and windows categories.

Going back to FIG. 2, application 108 also includes items 204. Items 204 may belong to a particular category in categories 202. In an embodiment, each item 204 may be a specific component, sub-product, or species within the category. For example, if category is of type window, then items 204 in the window category may include different types of windows, such as arched windows, bay windows, double hung windows, garden windows, casement windows, egress windows, round windows, sliding windows, two-part sliding windows, three-part sliding windows, etc.

Like categories 202, items 204 and relationship between items 204 and respective categories 202 may be stored in database 112 and/or database 114, or another memory storage accessible to application 108. In an embodiment, the items 204 within each category 202 may be uploaded to database 112 by third parties, such as the manufacturers of items 204 in each category 202.

In an embodiment, each item 204 includes one or more features 206. Features 206 are details or specifications associated with each item 204. Example features may include item brand, style, size, quality/grade, color, finish, estimate labor for installation, item cost, item specifications, etc. In an embodiment, features 206 associated with each item 204 may be uploaded to database 112 by third parties, such as the manufacturers of items 204 in each category 202.

FIG. 4 is a screen shot of application 108 displaying items 204 and features 206, according to an embodiment. In FIG. 4, application 108 displays multiple items 204, which are types of windows, and multiple features 206 that are associated with each respective type of window. In an embodiment, application 108 may receive a selection from a user that selects one or more items 204 and quantity of each selected item. In an embodiment, the selected quantity may also become a feature associated with the respective item 204.

In an embodiment, application 108 may receive a selection of a feature from features 206. Example selected feature may be size or color. In response to the selection, application 108 may display one or more items 204 from a category that include the selected feature. In this way, application 108 may be used to narrow down items 204 that include the selected feature and then select one or more items from items 204 for inclusion into digital contract 110.

Going back to FIG. 2, application 108 includes an exemplary contract generator 208. Unlike conventional contracts that are pre-written and cannot be dynamically regenerated from scratch, contract generator 208 dynamically generates and regenerates the digital contract 110 in real-time based on the input received as the terms and conditions of the digital contract 110 are being added and/or modified.

Figure 5:
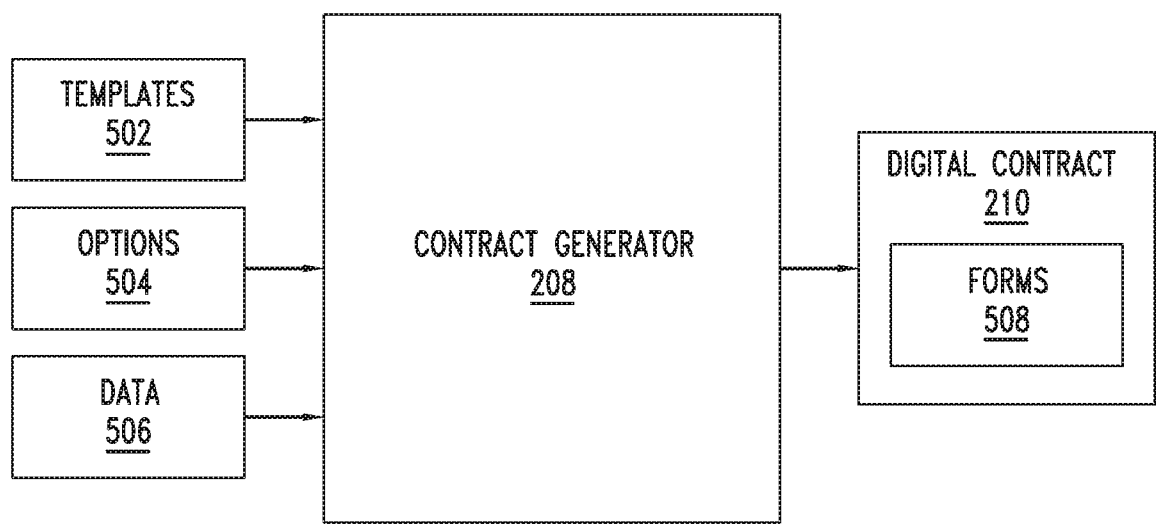
FIG. 5 is a block diagram of a contract generator configured to generate a digital contract, according to an embodiment.

FIG. 5 is a block diagram 500 of the contract generator 208 configured to generate the digital contract 110, according to an embodiment. To generate the digital contract 110, contract generator 208 uses templates 502 and options 504. Templates 502 may be software structures that are stored in a computer memory and include functions that execute to retrieve, combine, and display data in a predefined format. In an embodiment, templates 502 define how a portion of the digital contract 110 associated with categories 202 will be laid out on the display screen of client device 104. For example, templates 502 may separate the layout into different sections and different pages when the digital contract 110 is displayed on client device 104. In another example, templates 502 may also include instructions that generate borders, add colors or watermarks to the digital contract 110, add shading, determine font colors, etc. In another example, templates 502 may include instructions that obtain the parameters of the electronic display of the client device 104 and divide the digital contract 110 into digital pages that are compatible with the electronic display of client device 104.

In a further embodiment, templates 502 may also include information pertaining to one or both parties of the contract. The information may include parties' names, addresses, corporate information, email, phone number, etc.

In an embodiment, each template in templates 502 may be associated with a category in categories 202. For example, one template may be associated with a window category, while a second template may be associated with a roof category described in FIG. 3. In this way, when contract generator 208 regenerates the digital contract 210 based on input associated with a particular category, contract generator 208 may regenerate the portion of the digital contract associated with that category, and not the entire digital contract 110.

In an embodiment, template 502 may be configured with multiple options 504. Options 504 may be customized to display data or receive input. For example, some options 504 may display text, while other options 504 may include drop down menus, input boxes that receive text and/or images, radio buttons or check boxes that receive different selections, etc. In another example, options 504 may include instructions that open a GUI window which may receive input that draws a sketch or a signature. Because each template 502 may be configured with different options 504, templates 502 may be customized for a particular category that is included in the digital contract 110.

In an embodiment, options 504 may display information associated with items 204 or features 206. Since items 204 and features 206 are retrieved from the database 112 and/or database 114, there is less chance that the information associated with items 204 and features 206 is not valid or incorrect.

In another embodiment, options 504 may also receive input that is associated with items 204 and features 206. To receive input, option 504 may be configured to display a text field, a checkbox, a drop-down menu or radio buttons. For example, when an item is a window of a particular brand, option 504 may be configured to display the window size or color for that brand in the drop-down menu.

In an embodiment, options 504 may also select or remove other options. For example, one option in options 504 may receive input which causes the contract generator 208 to create additional options and display the additional options in the regenerated digital contract 110. Similarly, in another example, an option from options 504 may receive input which causes the contract generator 208 to remove other options in the regenerated digital contract 110. In this way, additional information in the digital contract 110 may appear or disappear based on the input that application 108 receives when information in options 504 is displayed on the display screen of client device 104.

In an embodiment, template 502 may specify an order by which options 504 will be displayed in the digital contract 110. The order may be specified in a chronological list, or according to the location of each option in options 504 in the digital contract 110. In an embodiment, contract generator 208 may generate the digital contract 110 in a top-down fashion.

In an embodiment, to generate digital contract 110, contract generator 208 incorporates data 506 into templates 502 and options 504. Data 506 may be information displayed in one or more options 504. Data 506 may also include information associated with categories 202, items 204, and features 206 that were selected for inclusion into the digital contract 110. Data 506 may also include preconfigured and/or customizable text, terms and conditions, etc., that template 502 or option 504 may be configured to include into digital contract 110.

To generate digital contract 110 dynamically, application 108 receives input which may be selection of one or more categories 202. In an embodiment, the categories 202 may be displayed on a display screen of client device 104 (as shown in FIG. 3) and selected using a GUI. Once application 108 receives the selection of one or more categories 202, contract generator 208 identifies template(s) 502 that are associated with the selected categories 202. Contract generator 208 then retrieves the identified templates 502, options 504 that are associated with the identified templates 502 and data 506 that is associated with each option 504, if any. From the retrieved templates 502, options 504, and data 506, contract generator 208 generates the digital contract 110.

In an embodiment, contract generator 208 generates digital contact 110 to include one or more digital forms or forms 508. Forms 508 are portions of the digital contract 110 and may be displayed using the GUI of application 108. In a non-limiting embodiment, each template 502 may generate one form in forms 508. Further, forms 508 may span several pages of the digital contract 110.

Figure 6:
FIG. 6 is a screen shot of the application displaying a digital form, according to an embodiment.

FIG. 6 is a screen shot 600 of application 108 displaying a digital form, according to an embodiment. As illustrated in FIG. 6, contract generator 208 generates form 602 for a "roofing" category. Example form 602 describes a proposed scope of work and terms and conditions for a "roofing" portion of the digital contract 110. In an embodiment, form 602 may be one of forms 508 described above.

In an embodiment, form 602 displays options 604. Options 604 are the displayed options 504 of template 502 that have been populated with data 506 or have been configured to receive input. For example, option 604A includes text stating "Included Scope Area" and describes the scope of work for the "roofing" project, while option 604B includes text stating "Excluded Scope" and describes the scope of work that is excluded from the "roofing" project. In an embodiment, the description that is displayed in options 604A and 604B may be preloaded into data 506. In another embodiment, the description may be received as input from a GUI of application 108.

In an embodiment, form 602 may also dynamically change based on the input received by application 108. For example, application 108 may receive input that either selects or deselects one or more options 604. As illustrated in FIG. 6, form 602 displays option 604C which includes text "Install Ice & Water Shield on Gutter Eaves and Valleys" and is currently selected as indicated by the green button shifted to the right. If, the GUI of application 108 receives input that deselects option 604C, by for example, moving the green button to the left, contract generator 208 may dynamically remove option 604C from form 602. In this embodiment, contract generator 208 may regenerate the digital contract 110 and display options 604 beginning with option 604D in the space vacated by option 604C (not shown).

In another embodiment, contract generator 208 may dynamically add an option to form 602 after contract generator 208 displays form 602 on the electronic display of the client device 104. The additional option may be generated based on a user input received by a GUI. Such input may include a selection from one of the displayed options 604 that may require additional input. For example, option 604E indicates that "Skylight Quantity" is set to zero. However, if application 108 receives input that changes the "Skylight Quantity" to another number, such as to two, contract generator 208 may regenerate the digital contract 110 to include additional option(s) that describe the two skylights (not shown) or provide a selection of the features associated with the two skylights. In one embodiment, the additional option(s) may be operable to receive the selection of the brand, type, size, color, etc. associated with the two skylights. In another embodiment, the additional option(s) may include data from the previously selected items 204 for a window of type skylight.

In yet another example, the GUI of application 108 may receive input that selects a particular brand of windows from one of options 604. Based on the input, contract generator 208 may regenerate the digital contract 110 to include additional option(s) that display sizes and colors of the selected brand.

In an embodiment, to add an additional option to form 602, contract generator 208 may regenerate form 602. For example, suppose the selection of a quantity in option 604E causes the contract generator 208 to add two additional options. Because contract generator 208 may regenerate form 602, contract generator 208 may add the two additional options next to or in the vicinity of option 604E, and modify the layout of the options in other portions of the digital contract 110 accordingly.

In an embodiment, application 108 may receive input that causes the contract generator 208 to generate an option that includes an image (not shown). An image may be a pictorial representation of one of the terms or conditions of the digital contract 110. For example, client device 104 may store an image of a roof for the "roofing" project discussed above. In this case, if contract generator 208 receives an indication to include the image of a roof into form 602, contract generator 208 may retrieve the image and regenerate form 602 to include an option that displays the image. In an embodiment, contract generator 208 may include the option that displays an image at a location in form 602 that is specified in the option.

Figure 7:
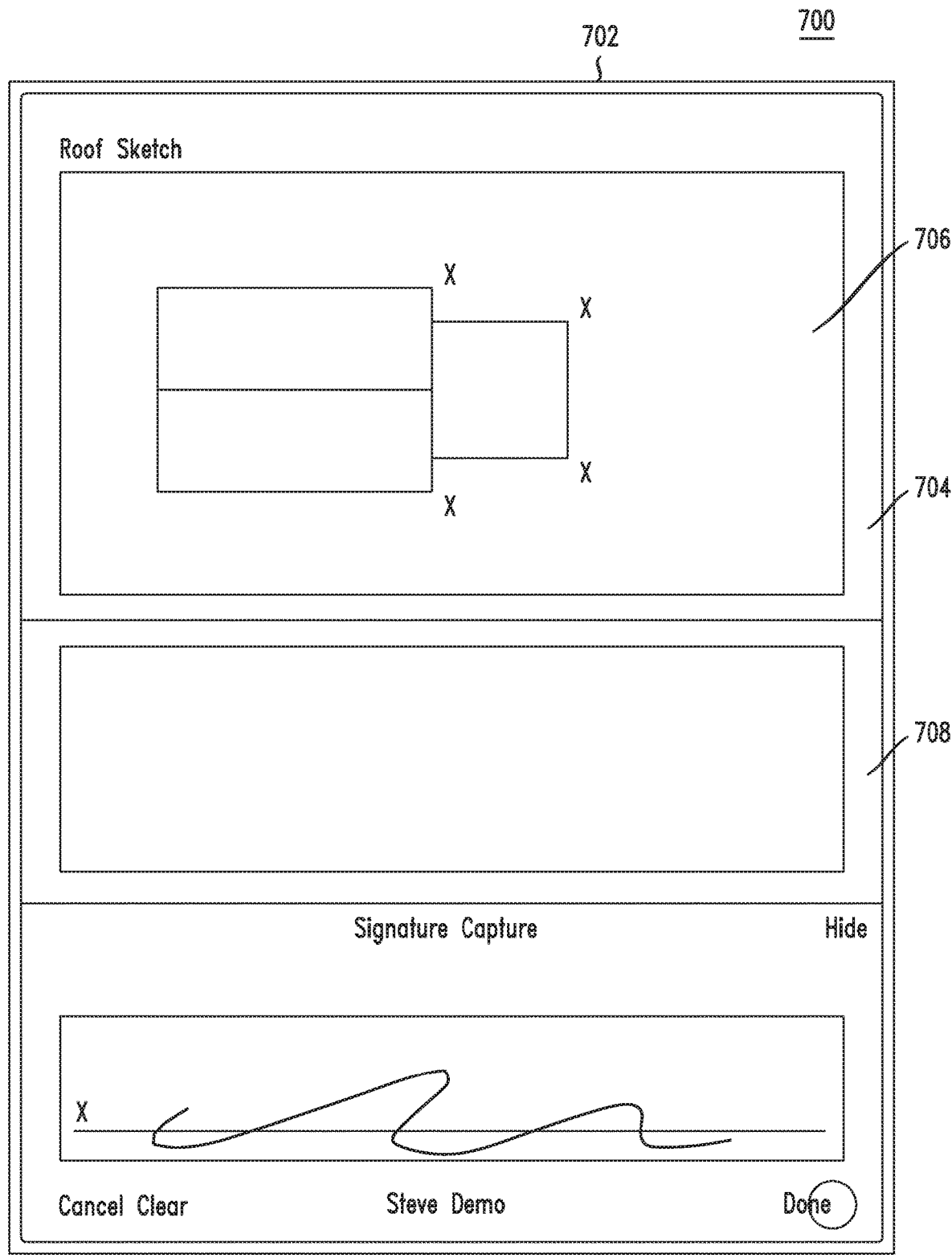
FIG. 7 is a screen shot of a digital form with an option that includes a sketch, according to an embodiment.

In an embodiment, contract generator 208 may generate an option that includes a sketch. FIG. 7 is a screen shot 700 of a digital form with an option that includes a sketch, according to an embodiment. Screen shot 700 displays form 702 with an option 704 that includes a sketch 706. In an embodiment, form 702 may be one of forms 508 and option 704 may be one of the displayed options 504.

To generate sketch 706, application 108 may allocate an area on form 702 that would receive sketch 706 as an input entered using mouse, keyboard, touch screen display, etc. Alternatively, application 108 may open a separate window that receives a sketch as input. The contract generator 208 may then use the input to draw a sketch within option 704 as shown in FIG. 7.

In an embodiment, contract generator 208 may allocate the space for the sketch based on the parameters of client device 104. Example parameters may be parameters associated with the dimensions of the electronic display of client device 104 and may be stored in the memory of client device 104. The contract generator 208 may retrieve the parameters from the memory of client device 104 and generate an option with a sketch that is a portion of the screen size of client device 104.

In an embodiment, contract generator 208 may include the option 704 with sketch 706 in the middle of the digital contract 110. For example, contract generator 208 may receive a selection of option 704 from another option displayed in form 702 (not shown). The selection may indicate for the sketch to be drawn next to option 708. Based on the selection, contract generator 208 may regenerate the digital contract 110 and include option 704 next option 708.

In another embodiment, contract generator 208 may generate an option 708 that includes comments. To generate an option that includes comments, contract generator 208 may allocate a portion on form 702 or open a new window on top of form 702 that would receive textual input by way of mouse, keyboard, touch screen display, etc. Once the contract generator 208 receives the textual input, contract generator 208 may generate option 708 that would display the textual input. To generate the option 708, contract generator 208 may allocate the size of option 708 based on the parameters of the client device 104 described above and the length of the textual input. As also described above, the contract generator 208 may include option 708 in any portion of form 702.

Going back to FIG. 3, digital contract 110 may also include terms and condition for payment options. Payment options may be similar to categories 202, and are labeled payment option categories 304 in FIG. 3. The payment option categories 304 may include "Cash & Finance", "Cash Only" and "Finance Only" options. However, the implementation is not limited to this embodiment, as application 108 may be configured to include other payment options.

In an embodiment, each one of the payment option categories 304 may be associated with a preconfigured template included in templates 502 and discussed in FIG. 5. Based on the selected payment option, contract generator 208 may use the template that corresponds to the payment option to generate a corresponding payment form. FIG. 8 is a screen shot 800 of a digital payment form, according to an embodiment. Screen shot 800 includes a payment form 802 and multiple options 804. In an embodiment, the payment form 802 is one or forms 508 and options 804 are options 504 that display data. Example options 804 include the total payment amount agreed to in the digital contract, amounts paid by cash and/or check, and financing details (one or more of financing term, monthly payment amount, interest rate, total interest owed, comparisons of any of the foregoing if one or more variables is changed, etc.). In an embodiment, application 108 may also receive input that may cause contract generator 208 to add additional options and regenerate form 802.

Contract generator 208 may also generate a form that includes descriptive information. To generate a form that includes descriptive information, contract generator 208 may also use templates 502, options 504, and data 506 discussed in FIG. 5. FIG. 9 is a screen shot 900 of a digital form displaying descriptive information, according to an embodiment. As shown in screen shot 900, form 902 includes multiple options 904. Options 904 may display descriptive information stored in data 506. In an embodiment, descriptive information is information associated with provisions in the digital contract 110, information associated with one or more categories 202 or one or more items 204. Example descriptive information shown in option 904 includes brochures that describe roofing, siding, and windows. Further, descriptive information may be included in form 902 as textual document, a link, or an image.

When application 108 receives input that indicates a selection of one or more options from options 904, contract generator 208 may add the descriptive information included in the selected option to the digital contract 110. As discussed above, contract generator 208 may regenerate the digital contract 110 to include the selected descriptive information. In another example, contract generator 208 may add the descriptive information to the end of the digital contract 110.

Going back to FIG. 2, in an embodiment, application 108 includes an email module 210. Email module 210 may email a copy of the digital contract 110 to one or more recipients. For example, once contract generator 208 completes adding forms and options to the digital contract 110, application 108 may receive input that includes email addresses of one or more recipients of the digital contract 110. FIG. 10 is a screen shot 1000 of application 108 receiving an email address, according to an embodiment. As illustrated in FIG. 10, form 1002 displays an email window that receives email address(es) as input. Email module 210 may then use the email address to send the digital contract 110 to one or more recipients. In an embodiment, the email module 210 may convert the digital contract 110 into a portable document format, another type of format or include the digital contract directly into the body of an email.

In an embodiment, email module 210 may format the email to one or more recipients of the digital contract 110. FIG. 11 is a screen shot 1100 of a formatted email, according to an embodiment. As shown in screen shot 1100, email module 210 may format the style and font of the body of the email 1001. As also shown in screen shot 1100, email module 210 may also format the links to the descriptive information discussed in FIG. 9 and include the links in the body of the email. For example, the links to the descriptive information 1102 selected using form 902 may be included in the email under the "more information" section.

Figure 12:
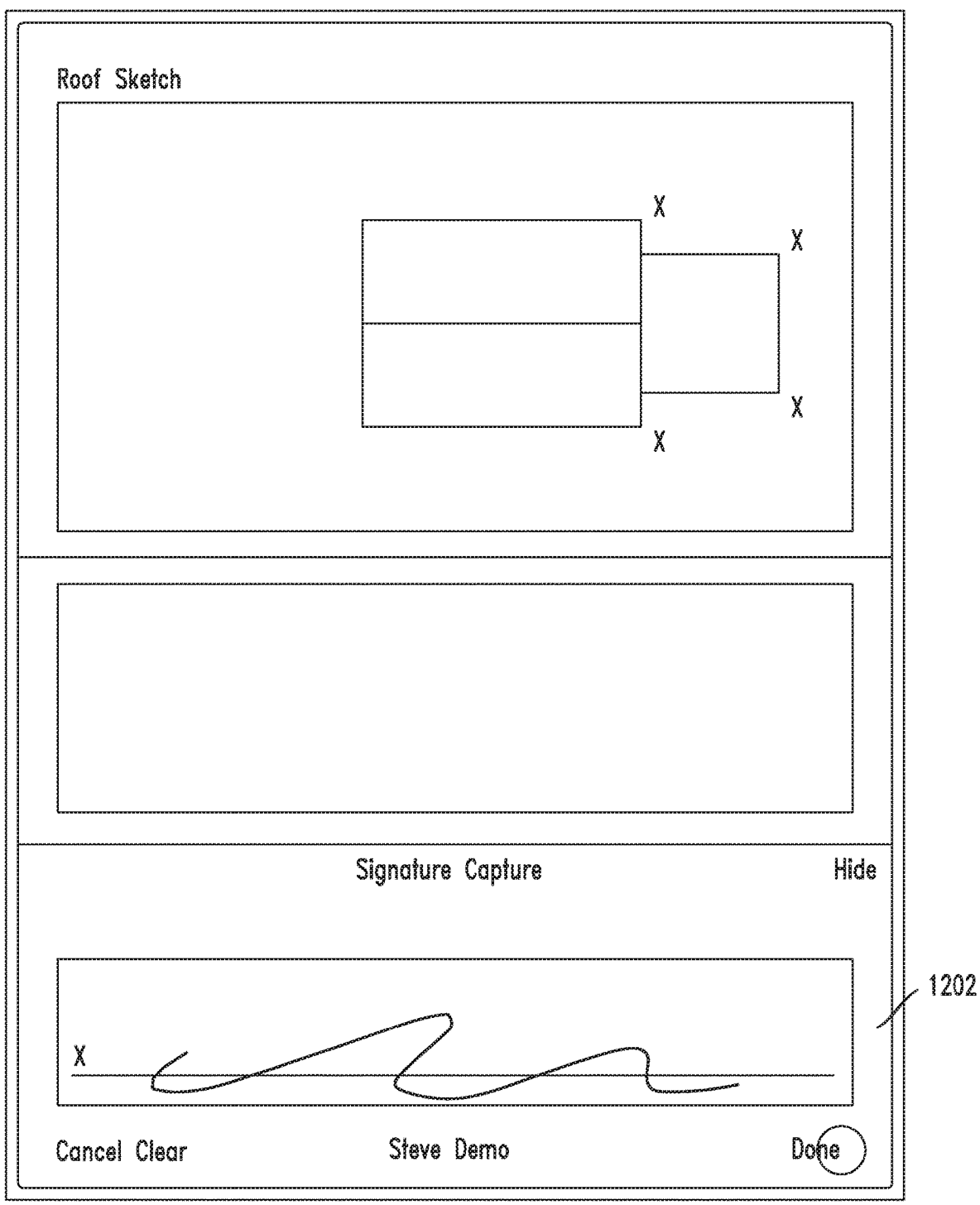
FIG. 12 is a screen shot of a signature window, according to an embodiment.

In an embodiment, application 108 also includes a signature module 212. The signature module 212 parses digital contract 110 and identifies pages in the digital contract that require user's signatures or initials. In an embodiment, signature module 212 may parse template 502 and identify options 504 in template 502 that are configured to include a signature or initials. Once signature module 212 identifies options 504 that require signature or initials, for each identified option 504 signature module 212 may display a signature window on the electronic display of client device 104. FIG. 12 is a screen shot 1200 of a signature window, according to an embodiment. As illustrated in FIG. 12, the signature capture window 1202 may receive user input that constitutes a signature or initials via a mouse, keyboard, or a touch screen display. Once received, the signature module 212 may incorporate the signature or initials into a portion of the digital contract 110 that is associated with the identified option.

In an embodiment, signature module 212 may traverse the entire digital contract 110 and identify each option 504 that requires a signature. The signature module 212 then obtains the signature via a signature capture window 1202 for each option 504. In another embodiment, signature module 212 may identify each option 504 that requires a signature and then present a single signature capture window 1202. Once the signature module 212 receives signature input from the signature capture window 1202, signature module 212 inserts the signature input into each option 504 that expects the signature.

Figure 13:
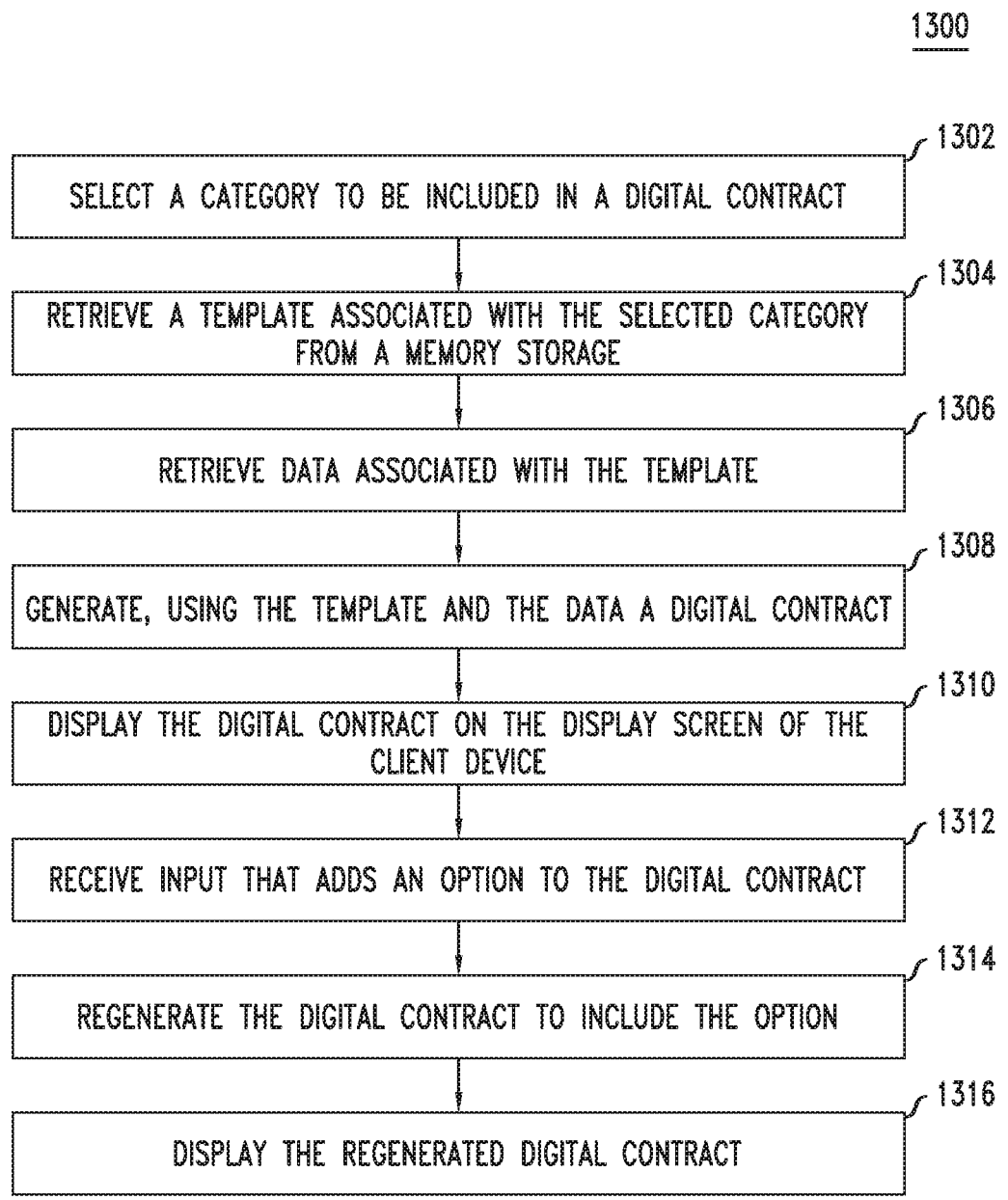
FIG. 13 is a flowchart of a method for generating a digital contract, according to an embodiment.

FIG. 13 is a flowchart of a method 1300 for generating a digital contract, according to an embodiment. Method 1300 may be performed using hardware and/or software components described in FIGS. 1-12. Notably, one or more of the operations may be deleted, combined, or performed in a different order as appropriate. Further, additional operations may be performed at various stages of the method. In an embodiment, prior to method 1300, categories 202, items 204, and features 206 may have been uploaded to databases 112 or 114 and templates 502, options 504, and data 506 may have been configured and stored in memory storage of client device 104.

At operation 1302, a category is selected. For example, contract generator 208 receives input that indicates which category from categories 202 may be included in the digital contract 110.

At operation 1304, a template associated with the category is retrieved. For example, contract generator 208 retrieves a template from templates 502 that is associated with the selected category. As discussed above, the template may include instructions and may be associated with multiple options 504. As also discussed above, contract generator 208 may use template 502 and options 504 to determine the layout of the portion of the digital contract 110 associated with retrieved template.

At operation 1306, data associated with the template is retrieved. For example, contract generator 208 retrieves data 506 associated with the template retrieved in operation 1304 and with options 504. As discussed above, data 506 may include selected items 204 from the category selected in operation 1302 and features 206 associated with items 204. Additionally, data 506 may include preconfigured data that may be included in the digital contract 110.

At operation 1308, a digital contract is generated. For example, contract generator 208 incorporates data 506 retrieved in operation 1306 into template 502 and options 504. Additionally, contract generator 208 lays out the options within template 502 using parameters of client device 104. Further, contract generator 208 may lay out options 504 in a predefined order.

At operation 1310, a digital contract is displayed. For example, contract generator 208 displays digital contract 110 on an electronic display of client device 104. As discussed above, contract generator 208 may display the digital contract 110 using one or more forms 508.

At operation 1312, an input to include an option is received. For example, application 108 may receive an input that adds an additional option to the digital contract 110.

At operation 1314, the digital contract is regenerated. For example, contract generator 208 may regenerate the digital contract 110 to display the option added in operation 1310. To regenerate the digital contract 110, contract generator 208 may perform the steps described in operation 1308 and include the additional option.

At operation 1316, a regenerated contract is displayed. For example, contract generator 208 displays the regenerated digital contract on the display screen of the client device 104. Because contract generator 208 regenerates the digital contract, the option that was added as a result of operation 1302 may be incorporated in the middle of the digital contract 110.

Figure 14:
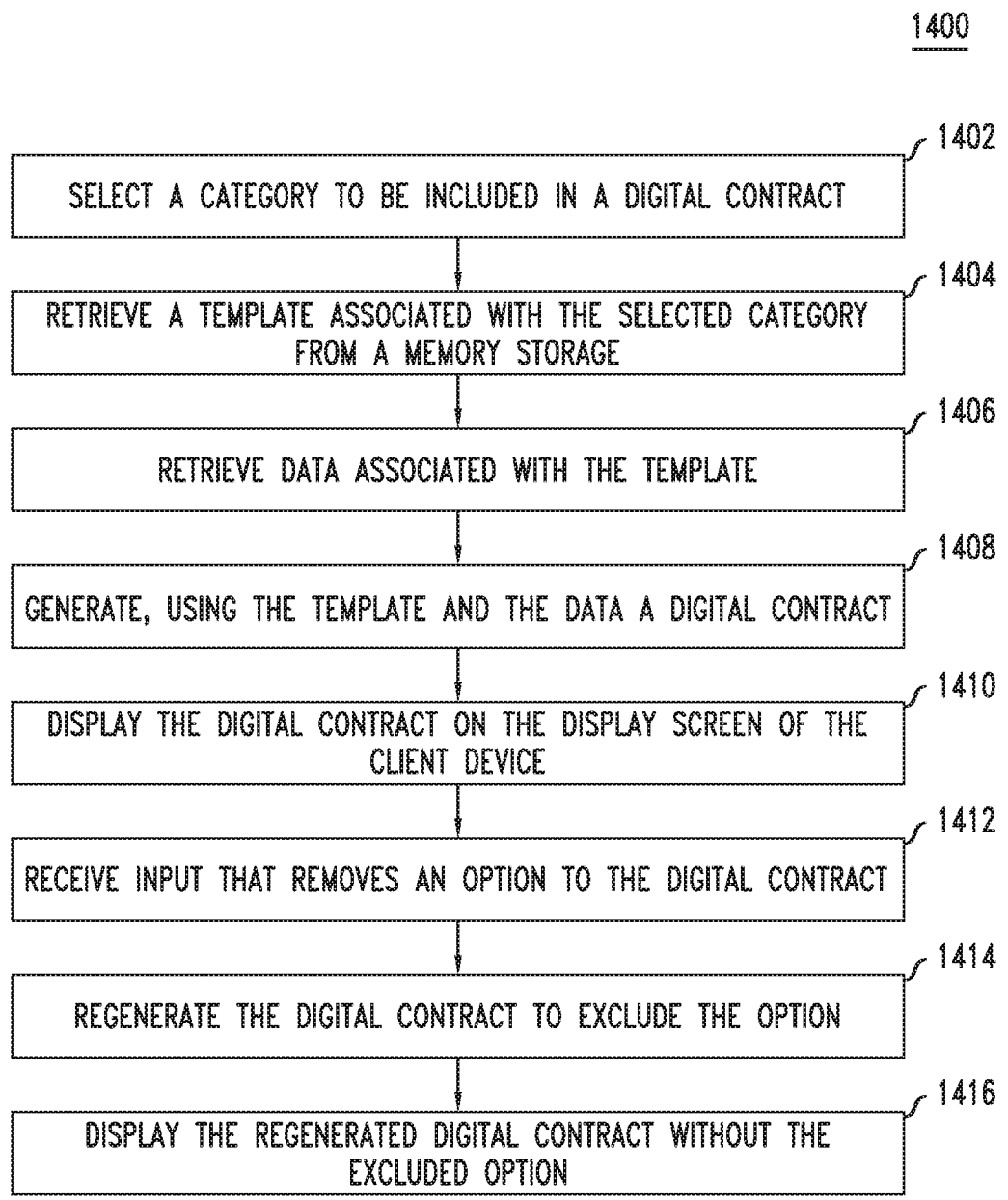
FIG. 14 is a flowchart of a method for generating a digital contract, according to an embodiment.

FIG. 14 is a flowchart of a method 1304 for generating a digital contract, according to an embodiment. Method 1400 may be performed using hardware and/or software components described in FIGS. 1-12. In an embodiment, operations 1402-1410 are similar to operations 1302-1310 described in flowchart 1300 of FIG. 13. At operation 1412, however, an input that removes one of the options from the digital contract 110 is received. For example, application 108 may receive an input that removes an arched window from the form associated with the category windows. Based on the input, the contract generator 208 may remove the option that describes the arched window from the digital contract 110.

At operation 1414, the digital contract is regenerated. For example, contract generator 208 may regenerate the digital contract 110 without the option described in operation 1412. As discussed above, the options remaining in the digital contract 110 may be laid out in the portion of the digital contract 110 vacated by the removed option.

At operation 1416, a regenerated contract is displayed as described in operation 1316.

Figure 15:
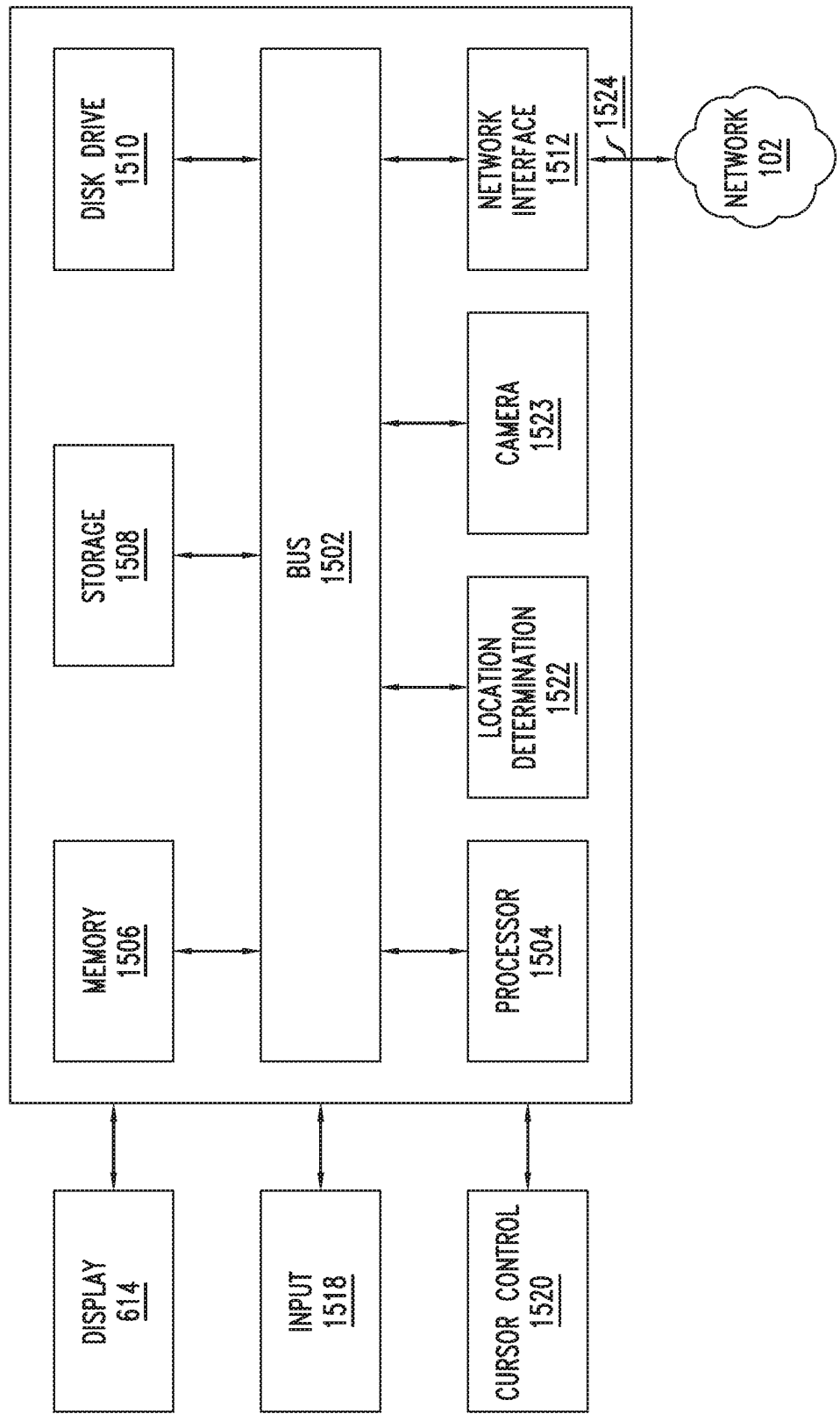
FIG. 15 is a block diagram of a computer system suitable for implementing one or more components in FIGS. 1-14, according to an embodiment.

Referring now to FIG. 15 an embodiment of a computer system 1500 suitable for implementing the systems and methods described in FIGS. 1-14 is illustrated.

In accordance with various embodiments of the disclosure, computer system 1500, such as a computer and/or a server, includes a bus 1502 or other communication mechanism for communicating information, which interconnects subsystems and components, such as a processing component 1504 (e.g., processor, micro-controller, digital signal processor (DSP), graphics processing unit (GPU), etc.), a system memory component 1506 (e.g., RAM), a static storage component 1508 (e.g., ROM), a disk drive component 1510 (e.g., magnetic or optical), a network interface component 1512 (e.g., modem or Ethernet card), a display component or a display screen 1514 (e.g., CRT or LCD), an input component 1518 (e.g., keyboard, keypad, or virtual keyboard), a cursor control component 1520 (e.g., mouse, pointer, or trackball), a location determination component 1522 (e.g., a Global Positioning System (GPS) device as illustrated, a cell tower triangulation device, and/or a variety of other location determination devices known in the art), and/or a camera component 1523. In one implementation, the disk drive component 1510 may include a database having one or more disk drive components.

In accordance with embodiments of the disclosure, the computer system 1500 performs specific operations by the processor 1504 executing one or more sequences of instructions contained in the memory component 1506, such as described herein with respect to the mobile communications devices, mobile devices, and/or servers. Such instructions may be read into the system memory component 1506 from another computer readable medium, such as the static storage component 1508 or the disk drive component 1510. In other embodiments, hard-wired circuitry may be used in place of or in combination with software instructions to implement the disclosure.

Logic may be encoded in a computer readable medium, which may refer to any medium that participates in providing instructions to the processor 1504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1510, volatile media includes dynamic memory, such as the system memory component 1506, and transmission media includes coaxial cables, copper wire, and fiber optics, including wires that include the bus 1502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 1500. In various other embodiments of the disclosure, a plurality of the computer systems 1500 coupled by a communication link 1524 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 1500 may transmit and receive messages, data, information and instructions, including one or more programs (i.e., application code) through the communication link 1524 and the network interface component

1512. The network interface component 1512 may include an antenna, either separate or integrated, to enable transmission and reception via the communication link 1524. Received program code may be executed by processor 1504 as received and/or stored in disk drive component 1510 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components including software, hardware, and/or both without departing from the scope of the disclosure. Where applicable, the various hardware components and/or software components set forth herein may be separated into sub-components including software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system configured to generate a digital contract, comprising:
    one or more non-transitory computer-readable memories storing an application that includes instructions; and
    one or more hardware processors coupled to each of the non-transitory computer-readable memories and configured to generate a digital contract, the instructions comprising:
        selecting a category using a graphical user interface of the application configured to execute on a client device;
        retrieving a template associated with the category, wherein the template includes a plurality of options;
        retrieving a first data associated with the template;
        generating the digital contract by incorporating the first data into the plurality of options associated with the template;
        formatting the digital contract using parameters of the client device, wherein the parameters cause the digital contract to fit on a display screen of the client device;
        displaying the digital contract on display screen of the client device;
        receiving input that causes an additional option from the plurality of options to be added to the digital contract;
        regenerating the digital contract by incorporating the first data into the plurality of options and a second data in the additional option;
        scanning the digital contract for an option that receives a signature as input;
        initializing a signature window;
        receiving the signature as the input; and
        regenerating the entire digital contract, wherein the regenerating includes the incorporation of the first data into the plurality of options and the second data in the additional option, the regenerated digital contract includes signature in the option, and the option does not overlay existing data or options displayed in the digital contract.

2. The system of claim 1, wherein the additional option is incorporated into the digital contract at a location specified in the additional option.

3. The system of claim 1, further comprising:
    receiving input that identifies an option from the plurality of options to be removed from the digital contract; and
    regenerating a portion of the digital contract by incorporating the first data into the plurality of options less the identified option and remaining options in the plurality of options are laid out in the portion in place of the identified option.

4. The system of claim 1, further comprising:
    identifying an option that generates a sketch;
    receiving the sketch as an input; and
    regenerating the digital contract to include the sketch.

5. The system of claim 1, further comprising:
    presenting a form that includes a plurality of descriptive materials;
    selecting at least one descriptive material from the plurality of the descriptive materials; and
    regenerating the digital contract, wherein the regenerated digital contract includes the selected at least one descriptive material.

6. The system of claim 5, wherein one of the plurality of descriptive materials is a brochure.

7. The system of claim 1, further comprising:
    selecting an item from a list of items;
    storing the item and a plurality of features associated with the item with the first data; and
    wherein the generated digital contract includes the item and a feature from the plurality of features.

8. The system of claim 1, wherein the formatting further comprises:
    obtaining the parameters from instructions included in the template;
    determining that the parameters include dimensions of the client device; and
    dividing the digital contract into digital pages using the dimensions of the client device.

9. The system of claim 1, wherein the regenerating further comprises:
    determining the additional option is associated with the second data stored in a database;
    retrieving the second data from the database; and
    incorporating the second data into the additional option, wherein the incorporated data is displayed within the option.

10. A method of regenerating an entire digital contract, which comprises:
    selecting a category using a graphical user interface of an application configured to execute on a client device;

retrieving a template associated with the category from a memory storage, wherein the template includes a plurality of options;
retrieving a first data associated with the template;
generating a digital contract by incorporating the first data into the plurality of options associated with the template;
formatting the digital contract using parameters of the client device, wherein the parameters cause the digital contract to fit on a display screen of the client device;
displaying the digital contract on the display screen of the client device;
receiving input that causes an additional option to be added to the digital contract; and
regenerating the digital contract by incorporating the first data into the plurality of options and a second data into the additional option;
scanning the category in the digital contract for an option from the plurality of options that receives a signature as input;
initializing a signature window;
receiving the signature as the input; and
regenerating the entire digital contract, wherein the regenerating includes the incorporation of the first data into the plurality of options and the second data in the additional option, the regenerated digital contract includes signature in the option, and the option does not overlay existing data or options displayed in the digital contract.

11. The method of claim 10, wherein the additional option is incorporated into the digital contract at a location specified in the additional option.

12. The method of claim 10, further comprising:
receiving input that causes an option from the plurality of options to be removed from the digital contract; and
regenerating a portion of the digital contract, wherein the regenerated digital contract excludes the option and remaining options in the plurality of options are laid out in the portion in place of the removed option.

13. The method of claim 10, further comprising:
identifying an option in the plurality of options that generates a sketch;
receiving the sketch as an input; and
regenerating the digital contract to include the sketch.

14. The method of claim 10, further comprising:
presenting a form that includes a plurality of descriptive materials;
selecting at least one descriptive material from the plurality of the descriptive materials; and
regenerating the digital contract, wherein the regenerated digital contract includes the selected at least one descriptive material.

15. The method of claim 14, wherein one of the plurality of descriptive materials is a brochure.

16. The method of claim 10, further comprising:
selecting an item from a list of items;
storing the item and a plurality of features associated with the item; and
wherein the generated digital contract includes the item and a feature from the plurality of features.

17. The method of claim 10, wherein the option does not overlay existing data or the plurality of options displayed in the digital contract.

* * * * *